US012087999B2

(12) United States Patent
Wang et al.

(10) Patent No.: US 12,087,999 B2
(45) Date of Patent: Sep. 10, 2024

(54) PACKAGE ANTENNA AND RADAR ASSEMBLY PACKAGE

(71) Applicant: CALTERAH SEMICONDUCTOR TECHNOLOGY (SHANGHAI) CO., LTD., Shanghai (CN)

(72) Inventors: Dian Wang, Shanghai (CN); Shan Li, Shanghai (CN)

(73) Assignee: CALTERAH SEMICONDUCTOR TECHNOLOGY (SHANGHAI) TECHNOLOGY CO., LTD., Shanghai (CN)

( * ) Notice: Subject to any disclaimer, the term of this patent is extended or adjusted under 35 U.S.C. 154(b) by 238 days.

(21) Appl. No.: 17/606,989

(22) PCT Filed: Apr. 28, 2019

(86) PCT No.: PCT/CN2019/084863

§ 371 (c)(1),
(2) Date: Oct. 27, 2021

(87) PCT Pub. No.: WO2020/220175

PCT Pub. Date: Nov. 5, 2020

(65) Prior Publication Data

US 2022/0209392 A1 Jun. 30, 2022

(51) Int. Cl.

*H01Q 1/22* (2006.01)
*H01Q 1/38* (2006.01)

(Continued)

(52) U.S. Cl.

CPC ............. *H01Q 1/2283* (2013.01); *H01Q 1/22* (2013.01); *H01Q 1/38* (2013.01); *H01Q 9/28* (2013.01);

(Continued)

(58) Field of Classification Search

CPC ........ H01Q 1/2283; H01Q 1/38; H01Q 9/285; H01Q 21/29; H01Q 13/106; H01Q 1/22; H01Q 9/28; H01Q 13/10

See application file for complete search history.

(56) References Cited

U.S. PATENT DOCUMENTS 4,710,775 A * 12/1987 Coe ........................ H01Q 13/18 343/793
7,742,001 B2 6/2010 Humphrey et al.

(Continued)

FOREIGN PATENT DOCUMENTS

CN 105609944 A 5/2016
CN 105762517 A 7/2016

(Continued)

OTHER PUBLICATIONS

China National Intellectual Property Administration (ISA/CN), PCT International Search Report for International Application No. PCT/CN2019/084863; 6 pages, Jan. 23, 2020, Beijing China.

*Primary Examiner* — Hai V Tran
(74) *Attorney, Agent, or Firm* — HAYNES AND BOONE, LLP

(57) ABSTRACT

The present disclosure provides a package antenna and a radar assembly package. The package antenna includes a first antenna and a second antenna adjacent to the first antenna. Directivity of electromagnetic wave from the package antenna is achieved through the cancelation of radiation fields from the first and second antennas.

11 Claims, 10 Drawing Sheets

(51) Int. Cl.
*H01Q 9/28* (2006.01)
*H01Q 13/10* (2006.01)
*H01Q 21/28* (2006.01)
*H01Q 21/29* (2006.01)

(52) U.S. Cl.
CPC ............. *H01Q 9/285* (2013.01); *H01Q 13/10* (2013.01); *H01Q 13/106* (2013.01); *H01Q 21/29* (2013.01)

(56) References Cited

U.S. PATENT DOCUMENTS

| | | | | |
|---|---|---|---|---|
| 8,018,375 | B1 * | 9/2011 | Alexopoulos | H01Q 19/10 343/912 |
| 10,887,439 | B2 * | 1/2021 | Kamgaing | H01Q 23/00 |
| 2004/0104859 | A1 * | 6/2004 | Lo | H01Q 21/0006 343/826 |
| 2006/0055619 | A1 * | 3/2006 | Sarabandi | H01Q 5/357 343/866 |
| 2007/0063056 | A1 | 3/2007 | Gaucher et al. | |
| 2009/0243940 | A1 * | 10/2009 | Humphrey | H01Q 1/2283 343/700 MS |
| 2016/0056544 | A1 | 2/2016 | Garcia et al. | |
| 2018/0076521 | A1 * | 3/2018 | Mehdipour | H01Q 15/0026 |
| 2018/0233465 | A1 | 8/2018 | Spella et al. | |
| 2019/0020110 | A1 * | 1/2019 | Paulotto | H01Q 5/20 |
| 2019/0027838 | A1 * | 1/2019 | Paulotto | H01Q 1/243 |

FOREIGN PATENT DOCUMENTS

| | | | |
|---|---|---|---|
| CN | 105932419 | A | 9/2016 |
| CN | 107134637 | A | 9/2017 |
| CN | 108649019 | A | 10/2018 |
| CN | 109088180 | A | 12/2018 |
| CN | 109149090 | A | 1/2019 |
| CN | 109244641 | A | 1/2019 |
| CN | 109244642 | A | 1/2019 |
| CN | 208336188 | U | 1/2019 |
| CN | 109326584 | A | 2/2019 |
| JP | 2010200211 | A | 9/2010 |

* cited by examiner

PACKAGE ANTENNA AND RADAR ASSEMBLY PACKAGE

CROSS-REFERENCE TO RELATED APPLICATIONS

This application is a 371 United States national phase application of co-pending international patent application No. PCT/CN2019/084863, filed Apr. 28, 2019, the entire contents of which are incorporated by reference in this application.

TECHNICAL FIELD

This disclosure relates to antenna technology, specifically the package antenna technology and the radar assembly package.

BACKGROUND

With enabling features of compactness and high integration in the front-end RF of high frequency bands such as mmWave, package antenna technology can be extensively applied in many areas, including wireless communications, radar detection, range measurement and imaging.

Traditional antenna design has to set a metallic plane as a ground or a reflector to ensure directivity of electromagnetic waves radiated by the antenna. The metallic layer, however, not only limits the reduction of antenna sizes but also makes the manufacturing more complex and difficult with reliability issues.

SUMMARY OF THE INVENTION

In accordance with the first aspect of this disclosure, a package antenna is provided, including:

- a first antenna;
- a second antenna adjacent to the first antenna;
- wherein directivity of electromagnetic waves radiated by the package antenna is achieved through cancelation of radiation fields from the first and second antennas.

In accordance with the second aspect of this disclosure, a package antenna is provided, including:

- a slot antenna;
- a dipole above a radiation plane of the slot antenna;
- a dielectric layer between the slot antenna and the dipole;
- directivity of electromagnetic waves radiated by the package antenna is achieved with the slot antenna functions as a reflector for the dipole.

In accordance with the third aspect of this disclosure, a radar assembly package is provided, including:

- a routing layer;
- a raw die on the routing layer;
- a package antenna in any embodiment in the present disclosure is electrically connected to the raw die through the routing layer.

The details of one optional embodiment of the present disclosure are set forth in the accompanying drawings and the description below. Other features, objects, and advantages of the invention will be apparent from the descriptions and drawings, and from the claims.

BRIEF DESCRIPTION OF DRAWINGS

The foregoing and other objects, features and advantages of the present disclosure will become more apparent from the following descriptions of embodiments thereof with reference to the accompanying drawings.

Figure 1:
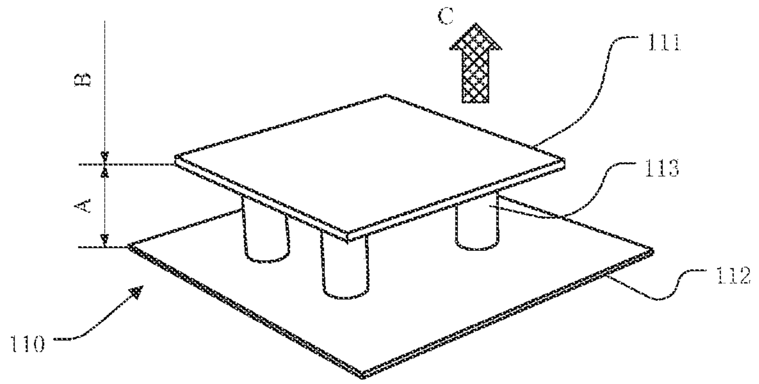
FIG. 1 is a structural view of the package antenna in an optional embodiment.

For a better description and illustration of embodiments and/or examples of the invention disclosed herein, reference may be made to one or more of the accompanying drawings. Additional details or examples for describing the drawings should not be construed as limiting the scope of any of the disclosed invention, the presently described embodiments and/or examples, and the best mode presently understood of the invention.

DETAILED DESCRIPTION

Further details, aspects and embodiments of the present disclosure will be described with reference to the drawings. In the drawings, like reference numbers are used to identify like or functionally similar elements. Elements in the figures are illustrated for simplicity and clarity, and have not necessarily been drawn to scale. Additionally, well-known elements of the present disclosure will not be described in detail or will be omitted.

For better understanding of the present disclosure, many specific details of the elements are described below, including structure, material, size, processing method and technology. As understood by those of ordinary skill in the art, the description is merely illustrative and does not limit the ways to realize the present disclosure.

In many fields as wireless communications, radar detection, range measurement, calibration and imaging, a metallic plane needs to be set as a reflector to achieve directional radiation in the antenna design, which brings about some technical issues, including the reduction of antenna sizes, manufacturing complexity and reliability. In one embodiment of this disclosure, a package antenna is provided, which includes two or more antennas adjacent to each other for the cancelation of radiation fields in designated areas, so as to achieve directional radiation of electromagnetic waves for the two or more antennas. Compared with traditional design of setting a metallic plane as a reflector to achieve radiation directivity, this embodiment not only further reduces the antenna sizes, but also makes antenna fabrication less difficult and more reliable. Specifically:

FIG. 1 is a structural view of the package antenna in an optional embodiment. In this embodiment, package antenna 110 includes first antenna 111 and second antenna 112. The package antenna 110 can have a compound antenna structure where second antenna 112 set adjacent to the first antenna 111 can cancel part of the electromagnetic radiation of antenna 111 so that antenna 111 can radiate in the targeted direction. Compared with the traditional design of setting a metallic plane as a reflector to achieve directivity, antenna 112 is compact in size, which enables further reduction in the size of antenna 110 as shown in FIG. 1 and manufacturing complexity, and increases reliability and integration.

In another optional embodiment, as shown in FIG. 1, second antenna 112 and first antenna 111 can cancel each other's radiation field in designated areas while part of electromagnetic waves from second antenna 112 can still reach the target area. This means electromagnetic radiation from both first antenna 111 and second antenna 112 can reach the target area to enhance the radiation power in the area, which further enhances the radiation power of package antenna 110 in the targeted direction. Besides, the directivity of package antenna 110 is also achieved due to the cancelation of electromagnetic waves from antenna 111 and antenna 112 in designated areas.

It should be noted that the designated areas in this embodiment includes the place between first antenna 111 and second antenna 112, such as Area A as shown in FIG. 1, and also includes the area antenna 112 facing away from one side of antenna 111 (the area below antenna 112 as shown in FIG. 1). In an optional embodiment, the designated area can also be the area near first antenna 111 where second antenna 112 is placed (the area below antenna 111 as shown in FIG. 1). Meanwhile, targeted area can be the area antenna 111 facing away from one side of antenna 112, such as Area B as shown in FIG. 1, so that package antenna 110 can radiate in the direction indicated by Arrow C. In this embodiment, the direction indicated by Arrow C is defined as "above."

Besides, in this embodiment, antenna radiation plane can include the surface through which electromagnetic waves are radiated. The direction of directional radiation can be the main direction the electromagnetic waves of the antenna are radiated towards, such as the direction of a main lobe and/or a secondary lobe.

In another optional embodiment, as shown in FIG. 1, following the direction of directional radiation of package antenna 110 (indicated by Arrow C), at least part of the second antenna 112's projections will be on the first antenna 111. This means second antenna 112 and first antenna 111 can be placed together in the direction of directional radiation of package antenna 110 so as to enhance the directivity of the radiation performance of package antenna 110.

In an optional embodiment, package antenna 110 radiates towards its right above direction (indicated by Arrow C), in which case second antenna 112 can be placed directly under first antenna 111 to effectively increase the radiation power of the package antenna 110 in the right above direction. Besides, the radiation planes of first antenna 111 and second antenna 112 are parallel to each other in their extension directions while the both extension directions can be orthogonal to the directional radiation direction of package antenna 110 to further increase the radiation power of package antenna 110 in the right above direction.

In an optional embodiment, as shown in FIG. 1, in the designated direction of package antenna 110, distance between first antenna 111 and second antenna 112 is larger than zero. To further increase the directivity of the radiation performance of package antenna 110, distance (d) between first antenna 111 and second antenna 112 can be expressed as follows:

$$d = (2m+1) * \frac{1}{4}\lambda;$$

d is the distance between first antenna 111 and second antenna 112 in the direction of directional radiation; n is an odd number; m is a natural number; and λ is the wavelength of the electromagnetic wave radiated by package antenna 110.

In an optional embodiment, as shown in FIG. 1, in response to the compactness requirement of small integrated parts including radar sensor chips, d can be set in a range, for example, $d \in (0, 0.75\lambda]$. d can be 0.1λ, 0.2λ, 0.25λ, 0.3λ, 0.4λ, 0.45λ, 0.55λ, 0.65λ and 0.75λ. The compactness requirement makes (2m+1)*0.25λ the preferred value for d. The closer to this value for d, the better directional radiation performance package antenna 110 will achieve.

In an optional embodiment, as shown in FIG. 1, first antenna 111 and second antenna 112 share a feeding line. First antenna 111 and second antenna 112 are directly electrically connected through connection line 113 so that second antenna 112 can also be fed through connection line 113 when first antenna 111 is fed, or first antenna 111 can also be fed through connection line 113 when second antenna 112 is fed. This means first antenna 111 can feed second antenna 112 or vice versa, which reduces the size of the feeding line brought by the additional antenna 112 and improves the consistency of electromagnetic waves radiated from first antenna 111 and second antenna 112.

Figure 2:
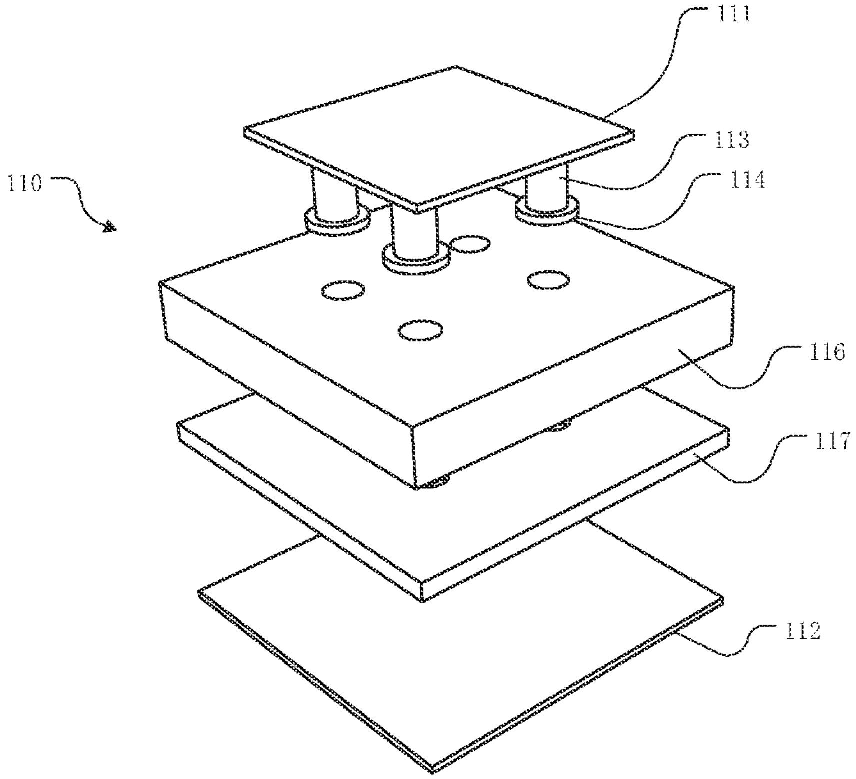
FIG. 2 is an exploded view of the package antenna in an optional embodiment.

FIG. 2 is an exploded view of the package antenna in an optional embodiment. As shown in FIG. 1 and FIG. 2, based on the structure shown in FIG. 1, a distance adjustment layer (not marked in figure) can be set between first antenna 111 and second antenna 112 to reduce costs in manufacturing package antenna 110 and improve performance in real applications. This distance adjustment layer, while insulating first antenna 111 and second antenna 112, can also meet distance requirements from real applications with different thickness designs.

In an optional embodiment, distance adjustment layer can have a compound or single-layer structure when necessary. For instance, as shown in FIG. 2, distance adjustment layer can include first dielectric layer 116 and second dielectric layer 117; first dielectric layer 116 can be used for insulation, and second dielectric 117 can be used for distance adjustment. In some optional embodiments, distance adjustment layer can be first dielectric layer 116. In this case, first dielectric layer 116 is used for both insulation and distance adjustment and there is no need to set second dielectric layer 117 between first antenna 111 and second antenna 112.

In one optional embodiment, as shown in FIG. 2, when package antenna 110 is used for radiating high frequency electromagnetic wave signals, the first dielectric layer 116 can be high frequency substrate and second dielectric layer 117 can be an organic layer so that both insulation and distance requirement are ensured.

In an optional embodiment, as shown in FIG. 2, to meet the design requirement of dielectric constants, dielectric constant of first dielectric layer 116 may be larger than that of second dielectric layer 117. For example, first dielectric layer 116 can be glass fiber board or epoxy resin board with high dielectric constant while second dielectric layer 117 can be an organic layer with low dielectric constant. First dielectric layer 116 and second dielectric layer 117 together as a compound layer make it easier to adjust the dielectric constant value of the dielectric material between second antenna 112 and first antenna 111, and second dielectric layer 117 helps meeting the distance requirement for second antenna 112 and first antenna 111 of the package antenna 110.

In an optional embodiment, as shown in FIG. 2, connection line 113 can be via conductors through the distance adjustment layer along the thickness direction. When multiple dielectric layers are set between second antenna 112 and first antenna 111, annular rings 114 can be formed between dielectric layers so that the via conductors through the dielectric layers can be electrically connected to each other to form the connection line for second antenna 112 and first antenna 111. In this way, better electrical connection is achieved, and manufacturing of connection line becomes less complex.

It should be noted that in real applications, annular rings 114 in FIG. 2 can be set between second dielectric layer 117 and first dielectric layer 116. In FIG. 2, annular rings 114 are set above first dielectric layer 116 only for better illustration. In this embodiment, first antenna 111 can be dipole or microstrip antenna, and antenna 112 can be patch or slot antenna.

Figure 3:
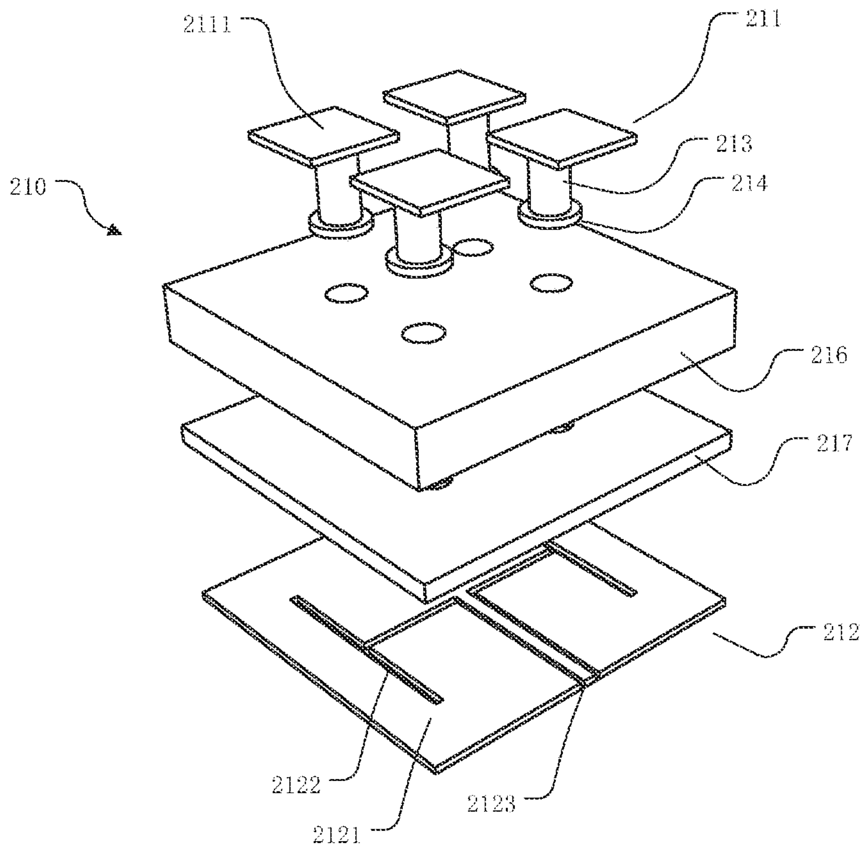
FIG. 3 is an exploded view of the package antenna in another optional embodiment.

FIG. 3 is an exploded view of the package antenna in another optional embodiment. In an optional embodiment, based on the structure shown in FIG. 2, illustration of the structure of the package antenna in this embodiment includes first antenna 111 being dipole and second antenna 112 being slot antenna. Specifically, as shown in FIG. 3, package antenna 210 includes dipole 211, slot antenna 212 and the distance adjustment layer between the two (not marked in figure). This distance adjustment layer includes organic layer 217 and high frequency substrate 216. Organic layer 217 is set on the slot antenna 212; high frequency substrate 216 is set on organic layer 217; dipole 211 is set on high frequency substrate 216. Meanwhile, dipole 211 and slot antenna 212 can be electrically connected to each other with the connection line 213 going through high frequency substrate 216 and organic layer 217 so that feeding line 2123 of slot antenna 212 can feed slot antenna 212 and each conductor 2111 of dipole 211 at the same time.

In an optional embodiment, dielectric constant requirement of package antenna 210 and distance between antennas can both be ensured by using high frequency substrate 216 of greater dielectric constant than that of organic layer 217. In an alternative embodiment, if the high frequency substrate 216 can meet both dielectric constant and distance requirement, then organic layer 217 can be omitted.

In an optional embodiment, as shown in FIG. 3, for better electrical connection and convenience of fabrication, annular rings 214 can be set on slot antenna 212 so that one side of a connection line 213 can electrically connect to slot antenna 212 through an annular ring 214 while the other side can connect to conductor 2111. If connection line 213 is a via conductor, then connection line 213 and dipole 211 can be fabricated simultaneously. This means conductor 2111 and the connection line 213 thereunder form an integral part and can be electrically connected to metallic plane 2121 through annular rings 214.

In an optional embodiment, as shown in FIG. 3, slot antenna 212 can be formed based on the slot structure of metallic plane 2121. For example, slot structure 2112 can be formed by cutting throughout a Redistribution Layers (RDL) to form the slot antenna 212. In this way, no additional metallic plane for slot antenna 212 is needed by sharing the RDL layer, which reduces the thickness of the package antenna 210 and costs of manufacturing.

Figure 4:
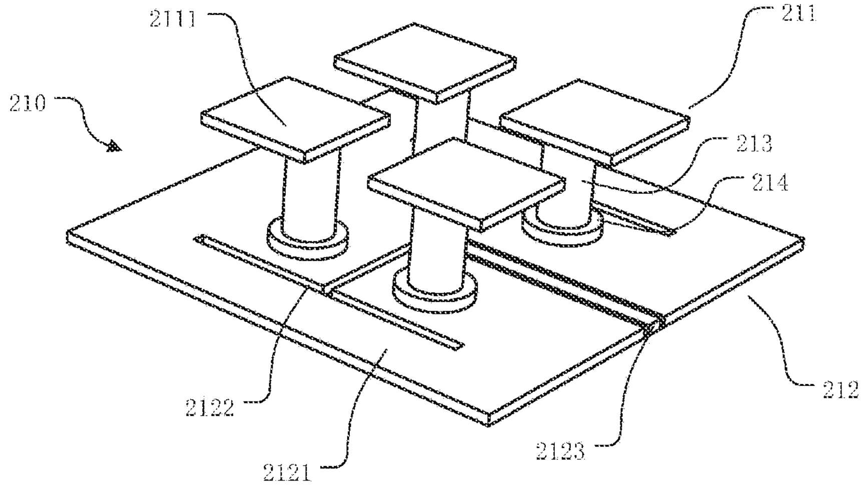
FIG. 4 is a 3D perspective view of metallic structures of the package antenna in one optional embodiment.
Figure 5:
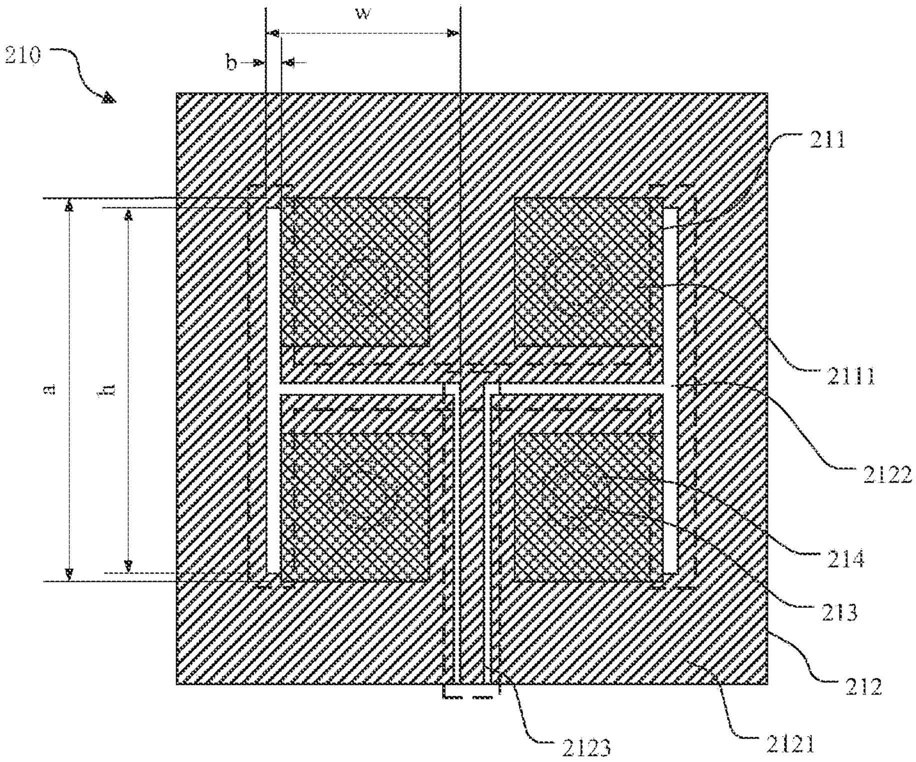
FIG. 5 is a top view of the structure as shown in FIG. 4.

FIG. 4 is a 3D perspective view of metallic structures of the package antenna in one optional embodiment. FIG. 5 is a top view of the structure as shown in FIG. 4. As shown in FIG. 4 and FIG. 5, in an optional embodiment, slot antenna 212 can have an H-shaped slot structure 2122. In the direction opposite to the direction of directional radiation of package antenna 210, any pair of conductors of dipole 211 can have their projections on both sides of slot structure 2122, which further enhances the directional radiation performance of package antenna 210. Distance (d) between slot antenna 212 and dipole 211 can be set at (0, 0.25λ]. For instance, the value of d can be 0.05λ, 0.15λ, 0.2λ or 0.25λ so that dipole 211 and its image antenna can have radiation fields with the same phase in the right above direction and meanwhile the radiation field of dipole 211 in the right below direction can be canceled by the radiation field of slot antenna 212 that has an opposite phase. This means dipole 211 and slot antenna 212 can form a compound antenna structure to achieve directional radiation of package antenna 210 and to expand the working bandwidth of the package antenna 210.

In another optional embodiment, as shown in FIG. 5, H-shaped slot structure 2122 have two first slots parallel to each other and an in-between second slot orthogonal to the two first slots. Feeding line can be set at the middle of the second slot and its one side can be set at one side wall of the second slot while the other side goes through the second slot to divide the second slot into two slot units of same length. Besides, slits at both sides of the feeding line 2123 can be used for one slot unit to go through. The equivalent length leq of the first slot and slot unit can be set from 0.5λ~λ (e.g. 0.5λ, 0.6λ, 0.7λ, 0.85λ, 1λ) and leq=(½*h+w). λ is the wavelength of electromagnetic waves that are radiated in the dielectric layer between dipole and slot antenna; h is the length of the first slot; w is the length of the slot unit. The width of first slot and second slot can both be b while the width of slits is smaller than b.

In another optional embodiment, dipole 211 above slot antenna 212 can include multiple pairs of conductors that are rectangular patches as shown in FIG. 5. In other words, dipole 211 can include multiple conductors 2111 that form an array. When any pair of conductors are projected on slot antenna 212, the two conductor 2111's projections are at both sides of the slot structure respectively. As shown in FIG. 5, dipole 211 can include four conductors 2111 or two pairs of conductors 2111. The projection of each conductor

2111 is on the area between two parallel first slots. The two conductors 2111 of each pair have their projections at the both sides of the second slot respectively with slot unit as an axis, which presents a symmetrical distribution. Meanwhile, the four conductors 2111 of the above-mentioned two pairs present a symmetrical distribution with feeding line 2123 as an axis in their projections.

In another optional embodiment, as shown in FIG. 4, regarding the antenna structure of integrated elements, the distance (d) between slot antenna 212 and dipole 211 can be set at around (0, 0.75λ]. For example, setting d at 0.25λ, will result in dipole 211's image antenna having the same radiation filed as dipole 211 in the right above direction of package antenna 210, and slot antenna 211 having the radiation field with exactly opposite phase to dipole 211 in the right below direction of package antenna 210 and then cancel each other. As shown in FIG. 4 and FIG. 5, dipole 211 and slot antenna 212 form the package antenna 210 with a compound antenna structure, which achieve the directional radiation of package antenna 210 and expands its working bandwidth.

In an optional embodiment, based on the structure in FIG. 2, antenna 111 as dipole and antenna 112 as slot antenna can be employed to describe the variation of package antenna structure in details.

Figure 6:
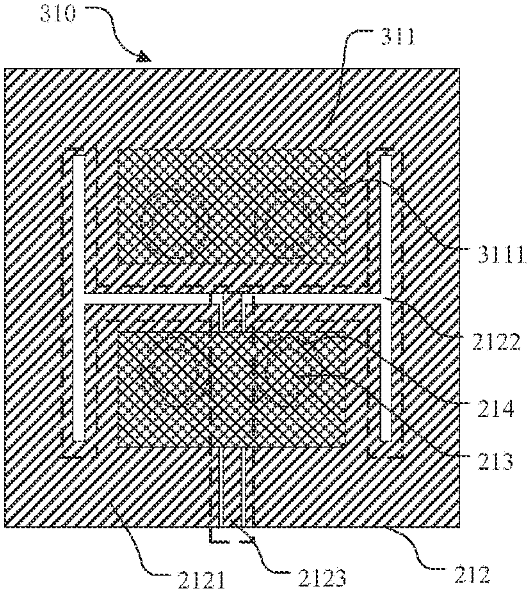
FIGS. 6 and 7 are top views of metallic structures of the package antenna that has other optional dipoles.

As shown in FIG. 6, package antenna 310 can include slot antenna 212, dipole 311 above slot antenna 212, connection line 213 for slot antenna 212 and dipole 311. In an optional embodiment, package antenna 310 also includes annular rings 214. Slot antenna 212 of package antenna 210 in this embodiment can be the same in the structure as the slot antenna of the package antenna as shown in FIG. 3 to FIG. 7 and similarities are not to be elaborated herein.

In an optional embodiment, as shown in FIG. 6, slot antenna 212 includes H-shaped slot structure 2122 that can have two first slots parallel to each other and an in-between second slot orthogonal to the two first slots. Dipole 311 can include two rectangular patch 3111 that form an array and the length direction of 3111 is orthogonal to the extension of the second slot of the H-shaped slot structure. The projections of the two patch 3111 of dipole 311 can be at the both sides of the H-shaped slot structure respectively.

Figure 7:
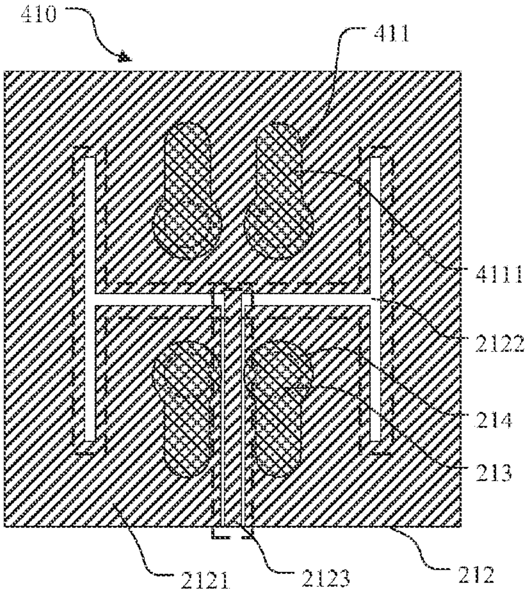

In another optional embodiment, as shown in FIG. 7, based on the structure in FIG. 2 and FIG. 6, the slot antenna of package antenna 410 can be the same in the structure as the slot antenna shown in FIG. 6 and similarities are not to be elaborated herein. Also, dipole 411 of package antenna 410 includes four rectangular patch 4111 that form an array. The extension of patch 4111 is parallel to the extension of the two parallel slots of the H-shaped slot structure. Four patches 4111 of dipole 411 comprise of two pairs of conductors and the projections of the two patch 4111 of each pair are at the both sides of H-shaped slot structure respectively.

In an optional embodiment, as shown in FIG. 7, the ends that are close to each other of the two patch 4111 of a pair can be connected through connection line 213. This means the ends have conformal shape as the connection 213 while the other ends are arcs.

It should be noted that the shape, quantity and distribution of conductors of the dipole in the above embodiment can be adjusted to practical needs as long as the projections of any pair of conductors of the dipole are at both sides of the slot structure of the slot antenna.

Figure 8:
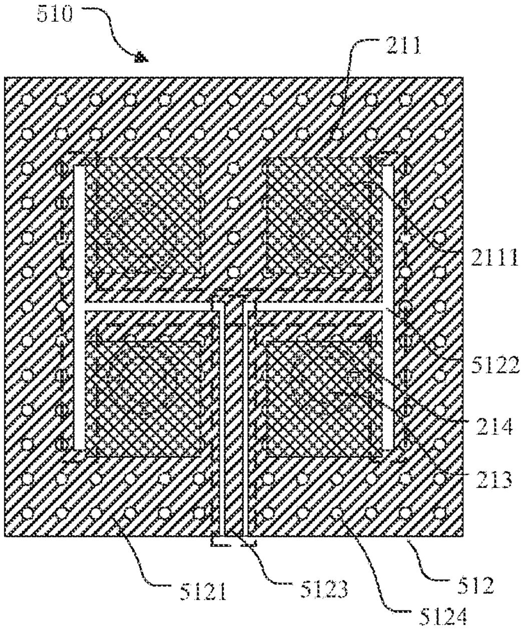
FIG. 8 is a schematic diagram of redundant structures in one optional embodiment.

FIG. 8 is a schematic diagram of redundant structures in one optional embodiment. As shown in FIG. 8, package antenna 510 can include slot antenna 512, dipole 211 above slot antenna 512 and connection line 213 for slot antenna 512 and dipole 211 connection. Metallic plane 5121 of slot antenna 512 has evenly distributed opening 5124 at its non-element area, such as round opening and square opening. The openings function as redundant structures, also known as dummy, to make the distribution more even so as to increase the yield rate and reliability of package antenna 510 by effectively lessening structure deformation caused by stress and differences among expansion coefficient in the fabrication process.

Figure 9:
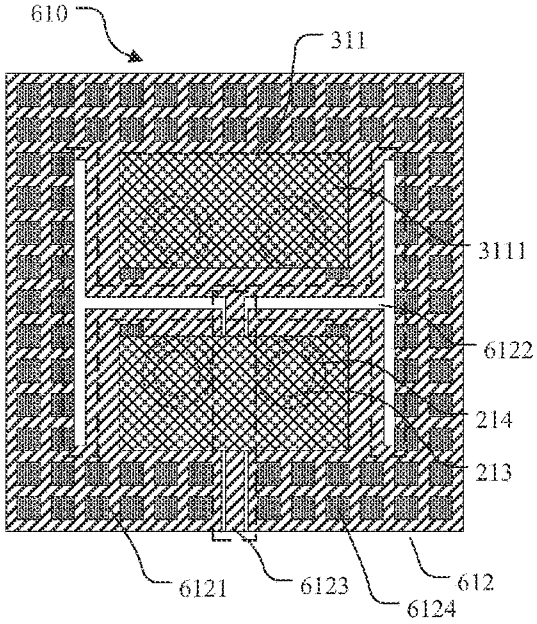
FIG. 9 is a schematic diagram of redundant structures in another optional embodiment.

FIG. 9 is a schematic diagram of redundant structures in another optional embodiment. In an optional embodiment, package antenna 610 can include slot antenna 612, dipole 311 above slot antenna 612 and connection line 213 for slot antenna 612 and dipole 311 connection. Slot antenna 612 can include metallic plane 6121, slot structure 6122 throughout the metallic plane 6121, feeding line 6123 on metallic plane 6121 and several metallic patches 6124 evenly distributed on metallic plane 6121. Metallic patches 6124 have the same function as the openings 5124 in FIG. 8, which can work as dummy to make the distribution more even, so as to increase the yield rate and reliability of package antenna 510 by effectively lessening structure deformation caused by stress and differences among expansion coefficient in the fabrication process.

It should be noted that the dummy in this embodiment can be adjusted to specific designs in terms of shape, size and distribution to increase the yield rate and reliability of package antenna.

Figure 10:
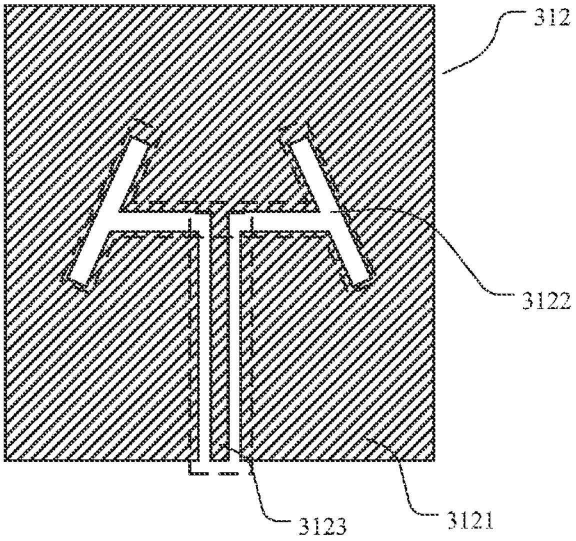
FIG. 10 is a vertical view of slot antenna in one optional embodiment.
Figure 11:
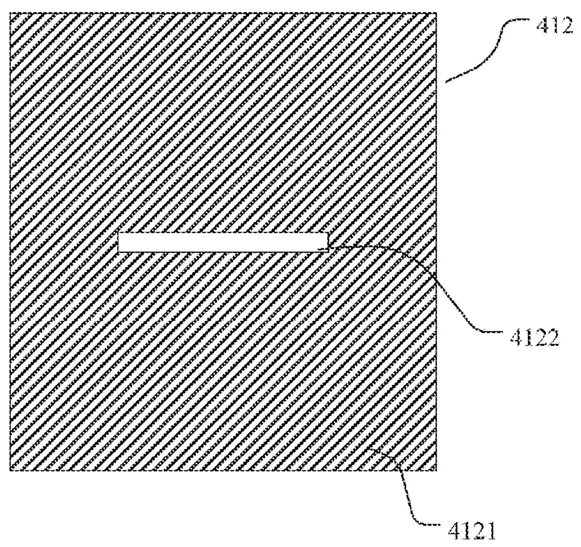
FIG. 11 is a vertical view of slot antenna in another optional embodiment.

FIG. 10 and FIG. 11 are top views of slot antennas with different slot shapes. In an optional embodiment, based on the structure shown in FIG. 2, examples are made to illustrate slot antennas with different slot shapes, specifically:

As shown in FIG. 10, in an optional embodiment, slot antenna 312 can include metallic plane 3121, slot structure 3122 throughout metallic plane 3121 and feeding line 3123 on metallic plane 3121. Slot structure 3122 can be the H-shaped slot structure as shown in FIG. 5, where the two parallel first slots are adjusted to extend towards each other with the same tilted angle to the second slot, to form slot antenna 312 of symmetrical distribution. In another optional embodiment, as shown in FIG. 11, slot antenna 412 can include metallic plane 4121 and the slot structure 4122 throughout the metallic structure 4121.

As shown in FIG. 11, the strip slot structure 4122 of slot antenna 412 can be used for radiating electromagnetic waves. The slot antenna 412 can be used to substitute the slot antenna of package antenna in all the above-mentioned embodiments. For example, in the case of package antenna in FIG. 3 to FIG. 9, package antenna can include the compound antenna comprising slot antenna 412 and dipole 211.

Figure 12:
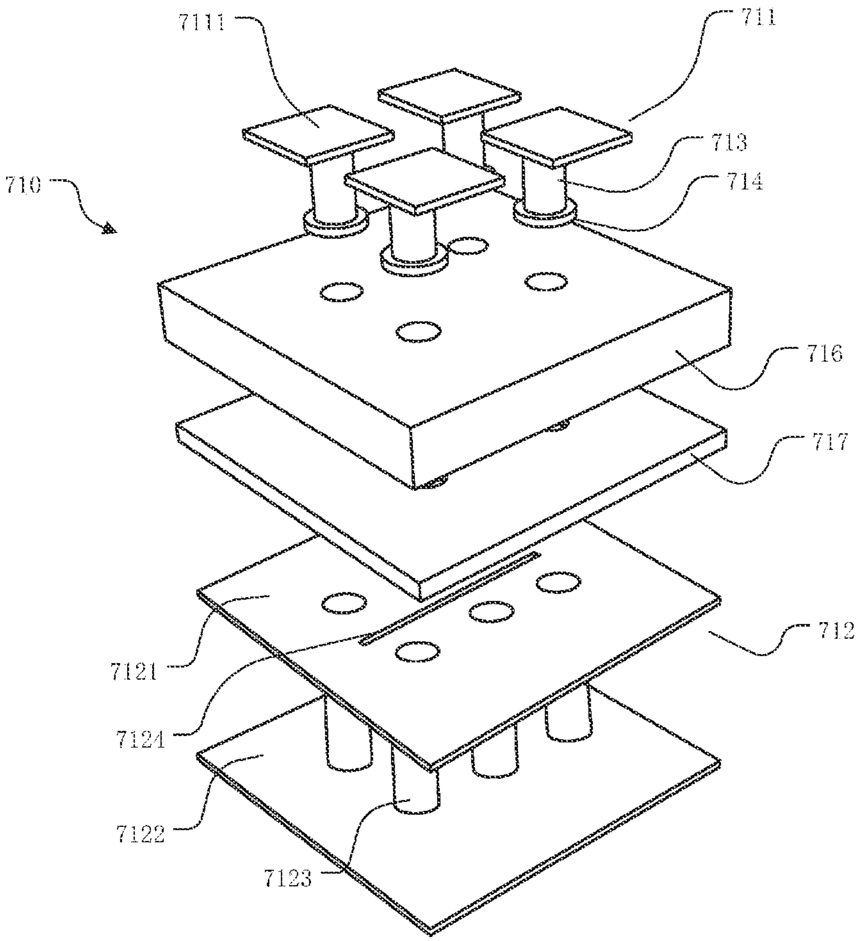
FIG. 12 is an exploded view of the package antenna that has a strip slot antenna in one optional embodiment.
Figure 13:
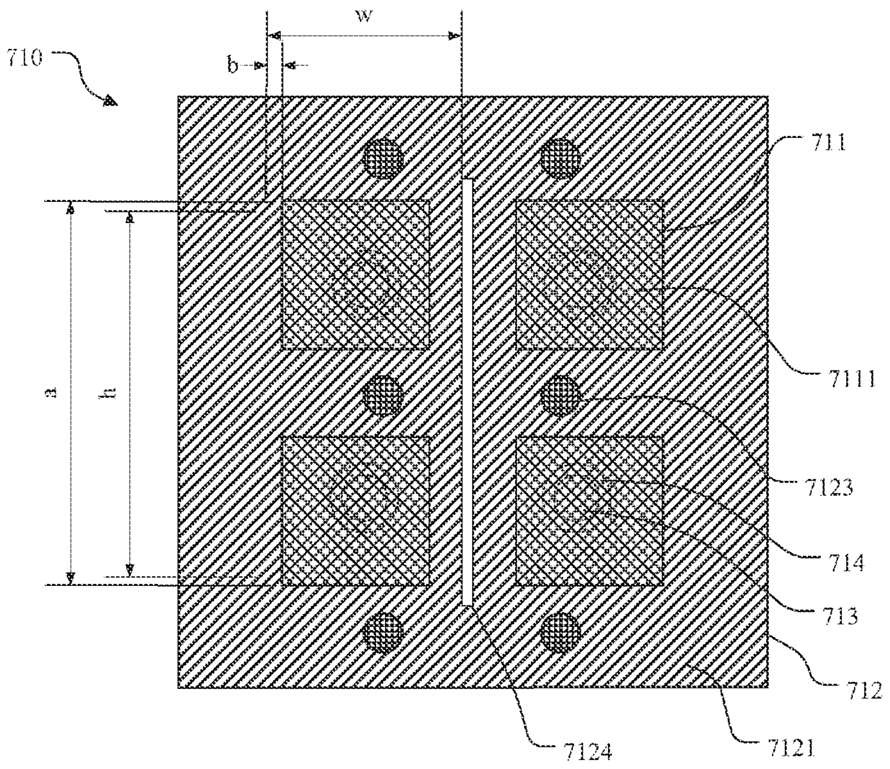
FIG. 13 is a top view of the package antenna that has a strip slot antenna in one optional embodiment.

FIG. 12 is an exploded view of the package antenna that has strip slot antenna in one optional embodiment. FIG. 13 is a top view of the package antenna that has strip slot antenna in one optional embodiment. For clarity, each part of the package antenna is shown separately in FIG. 12 while substrate layer 716 and insulation layer 717 can be omitted in FIG. 13.

As shown in FIG. 12, in one optional embodiment, package antenna 710 can include strip slot antenna 712, dipole 711 above strip slot antenna 712, substrate layer 716 between dipole 711 and strip slot antenna 712, and connection line 713 for strip slot antenna 712 and dipole 713. In one optional embodiment, package antenna 710 can also include annular rings 714 and insulation layer 717. When the dielectric layer for strip antenna 712 and dipole 711 has a single-layer structure as shown in FIG. 12, annular rings 714 can be omitted if there is just dielectric layer 716 or insulation layer 717 to be set between dipole 711 and strip slot antenna 712.

In another embodiment, as shown in FIG. 12, strip slot antenna 712 can include first metallic plane 7121, second metallic plane 7122 and slot structure 7124 cut through the first metallic plane 7121. Slot structure 7124 includes strip slots. The connection line 7123 between first metallic plane 7121 and second metallic plane 7122 is distributed at the both sides of strip slots. The first metallic plane 7121, the second metallic 7122 and the connection line 7123 form a waveguide. In an optional embodiment, strip slot antenna 712 can include a metallic waveguide with strip slot structure 7124 on its surface. In the dipole 711 that together with the strip slot structure forms package antenna 711, the projections of conductors (i.e. metallic patch 7111) in any pair are distributed at the both sides of the strip slot of strip slot structure 7124, i.e. the upper and lower side of strip slot structure 4122 as shown in FIG. 11.

It should be noted that slot antenna in this embodiment, can have an asymmetrical distribution, such as S-shaped slot antenna and L-shaped slot antenna, or a symmetrical distribution such as the H shape shown in FIG. 5. Or simply, the slot antenna can be the strip slot antenna in FIG. 13 as long as it can form the package antenna with its corresponding dipole.

Also, package antenna in this embodiment can be an independent module or antenna unit that with other components forms RF module. This package antenna can be applied in such fields as wireless communications, radar detection, range measurement and imaging, and can also be used in sensors for industrial, automotive, consumable electronics and smart home areas, including mmWave sensors.

In real applications, as there is a linear correlation between antenna size and the wavelength of guided wave of antenna substrate, the size of antenna operating at high frequency is relatively small and package antenna (Package antenna) structure can be realized. In response to areas where package antenna is needed, such as HF sensors, this embodiment also provides a package antenna, which based on the package antenna in the above-mentioned embodiments, has a compound antenna structure by setting dipole and slot antenna adjacent to each other so as to realize radiation in the designated direction. This package antenna, while improving the power intensity distributed in the designated radiation area, uses slot antenna as the reflector for dipole, which further reduces the thickness of the package antenna, increases the flexibility of antenna placement, and at the same time effectively makes the antenna less difficult in the fabrication and more reliable, compared with the traditional design of setting a metallic plane as reflector to realize the directivity.

Specifically, in an optional embodiment, package antenna can include slot antenna, dipole and substrate layer. Dipole is set above the antenna radiation plane of the slot antenna to realize the designated radiation of the compound antenna structure comprising of slot and dipole. And substrate layer can be set between dipole and slot antenna for insulation and adjusting the distance between dipole and slot antenna by changing its thickness, which furthers improves the performance of directional radiation of the compound antenna structure. Package antenna in this embodiment can be used as dual-mode antenna for medium and high frequency in many fields, such as for mmWave frequency in 5G communication system and 77-GHz and 24-GHz frequency in radar.

In an optional embodiment, at least part, if not all, of the projections of dipole fall on the antenna radiation plane of the slot antenna in the direction opposite to the directional radiation direction, which improves the directional radiation performance of the package antenna. What's more, the performance can be further improved by adjusting the distance between slot antenna and dipole in the radiation direction. For example, the distance (d) between slot antenna and dipole in the radiation direction, $\in(0, 0.75\lambda]$ and d can be $0.12\lambda$, $0.22\lambda$, $0.252\lambda$, $0.32\lambda$, $0.42\lambda$, $0.452\lambda$, $0.552\lambda$, $0.652\lambda$ or $0.75\lambda$. Setting the value of d as close as possible to $0.25\lambda$ can strike a balance between package antenna size and its directional radiation performance. The $\lambda$ is the wavelength of the electromagnetic wave radiated from package antenna.

In another optional embodiment, antenna radiation plane of slot antenna is parallel to that of dipole and the projections of any pair of conductors of dipole in the direction opposite to directional radiation direction are at both sides of the slot structure of slot antenna respectively. Each conductor can be electrically connected to slot antenna, with the connection line throughout the dielectric layer, which means dipole can be fed through slot antenna and directivity of package antenna is therefore further enhanced.

In an optional embodiment, this disclosure also provides a package unit of radar modules, which includes routing layer, raw die on routing layer and the mentioned package antenna in any embodiment of the present disclosure. Raw die can be electrically connected to package antenna through routing layer, which together form a radar sensor chip integrated with directional dual-mode antenna.

In an optional embodiment, package antenna of a radar assembly package can include slot antenna and dipole above the radiation plane of slot antenna while a radar assembly package can also include package layer that packages the mentioned raw die on routing layer. The dipole and raw die are integrated at one side of routing layer, and the other side of the routing layer opposite to the side having the raw die can be set with solder balls. The mentioned dipole can be integrated either in the package layer to from AIP (Antenna in Package) or on the surface of the package layer to form AOP (Antenna-on-Package). In some cases, AIP and AOP package antennas can be mutually substituted.

In another optional embodiment, in a package unit of radar models, slot antenna of package antenna can be the antenna of the slot structure in the metallic layer fabricated in the package layer and can be electrically connected to dipole through via conductors so that dipole can be fed through slot antenna, which improves the commonality of radiation signals from slot antenna and dipole by reducing package antenna size with less feeding line.

In an optional embodiment, in a package unit of radar models, slot antenna of package antenna can be the antenna of the slot structure set on the routing layer and can be electrically connected to dipole through via conductor so that dipole can be fed through slot antenna, which further reduces package antenna size by omitting metallic plane and ensures the commonality of radiation signals from slot antenna and dipole.

In another optional embodiment, to make metallic materials more evenly distributed, dummy can be set in the blank area (non-element area) of the metallic or routing layer where slot antenna is formed, which in fact defines the area where slot structure is set as element area.

Details of a radar assembly package and package antenna in it will be illustrated in the following with reference to the drawings:

In this embodiment, package antenna can include dipole and slot antenna. "Front" radiation means radiation in the direction orthogonal to the metallic plane of dipole and away from slot antenna (indicated by the arrow from FIG. 14 to FIG. 18). "Back" radiation means radiation in the direction orthogonal to the metallic plane of dipole and towards slot antenna (opposite to the direction indicated by the arrow from FIG. 16 to FIG. 19).

Figure 14:
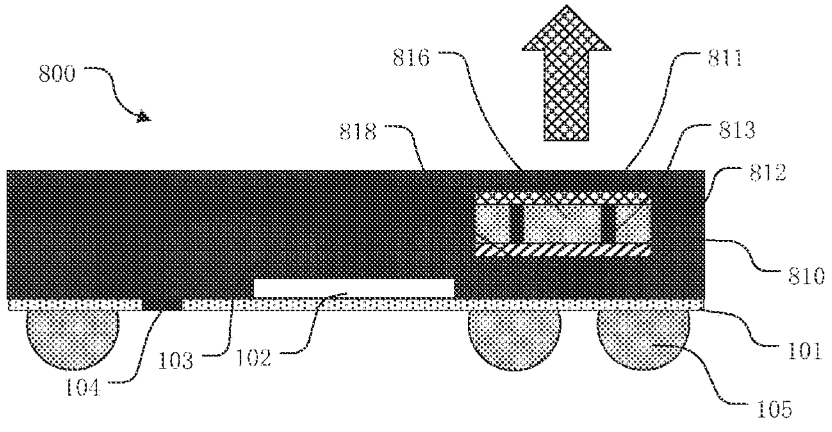
FIG. 14 is a cross-sectional view of the radar assembly package in one optional embodiment.

FIG. 14 is a cross-sectional view of the radar assembly package in one optional embodiment. Radar assembly package 800 includes routing layer 101, raw die 102 on routing layer 101, package layer 103 covering raw die 102 and AIP package antenna 810 in package layer 103. Routing layer 101 can be fan-out metallic plane and Package antenna 810 can be electrically connected to raw die 102 through routing layer 101.

In an optional embodiment, as shown in FIG. 14, AIP package antenna 810 can be fabricated separately and then packaged together with raw die 102. Or, each part of AIP package antenna 810 can be fabricated during the packaging processes of raw die 102 to form wafer-level package antenna, which increase inflexibility.

For example, as shown in FIG. 14, AIP Package antenna 810 can include antenna 812, antenna 811 above the radiation plane of antenna 812, dielectric layer 816 between antenna 811 and antenna 812, and connection line 813 (e.g. via conductors) for antenna 812 and antenna 811. In this embodiment, each part of AIP package antenna 810 can be fabricated during the packaging processes of raw die 102 to form wafer-level package antenna. Also, the specific structures of antenna 811 and antenna 812 are the same as those of first antenna (slot antenna) and second antenna (dipole) as shown in FIG. 1 to FIG. 13. For clarity and simplicity, similarities are not to be elaborated herein.

In one optional embodiment, dielectric layer 816 in FIG. 14 can be glass fiber board or epoxy resin board (FR4), ceramic substrate or HF/RF substrate and its insulation can insulate antenna 812 from antenna 811. Antenna 812 and antenna 811 both can be the result of the patterning of metallic plane while connection line 813 can be via conductors that fill the holes of dielectric layer 816 with copper material. To make distribution more even, dummy 104 in the form of hole or metallic patch can be set in the blank area (non-element area) of routing layer 101.

In another optional embodiment, raw die 102 as shown in FIG. 14 can send signals to antenna 812 through routing layer 101 and feeding line 818, and can further send signals to antenna 811 through connection line 813. In other alternative embodiments, package antenna 810 can include transmission line coupled with ground layer and use transmission line instead of feeding line to transmit signals. It can also feed antenna 811 and antenna 812 with a separate transmission line through routing layer 101.

Radar assembly package 800 is an example of the above integral package structure. Also, solder balls 105 can be set on the second surface of routing layer 101 for connection with external circuitries.

Figure 15:
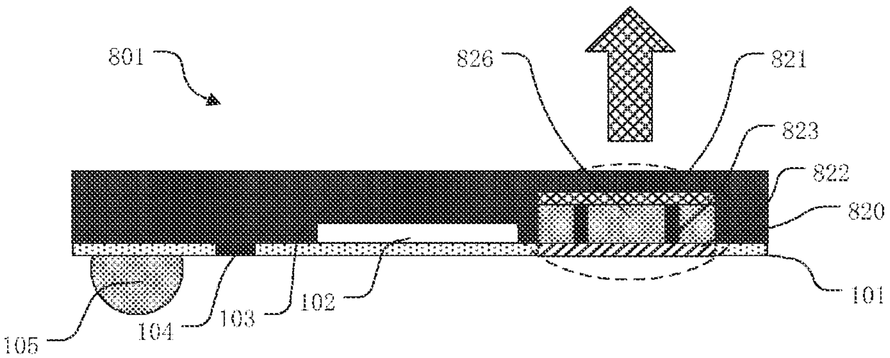
FIG. 15 is a cross-sectional view of the radar assembly package in another optional embodiment.

FIG. 15 is a cross-sectional view of the radar assembly package in another optional embodiment. Radar assembly package 801 includes routing layer 101, raw die 102 on routing layer 101, package layer 103 covering raw die 102, and AIP package antenna 820 in package layer 103. Routing layer 101 can be used for fan-out and AIP package antenna 820 can be electrically connected to raw die 102 through routing layer 101.

In this embodiment, AIP package antenna 820 can include antenna 822, antenna 821 above the radiation plane of antenna 822, substrate layer 826 between antenna 821 and antenna 822, and connection line 823 (e.g. via conductors) for antenna 822 and antenna 821.

In AIP package antenna 820 of radar assembly package 801, connection line 823 goes through distance adjustment layer 826, and antenna 821 are electrically connected to antenna 822 through via conductors. Antenna 822 can be set in the metallic plane of routing layer 101 and electrically connected to raw die 102 through routing layer 101. For example, antenna 822 can be formed by slot pattern as result of etching on metallic plane of routing layer 101. Compared with the radar assembly package as shown in FIG. 14, the radar assembly package as shown in FIG. 15 omits feeding line 828. This means there is no need to have a metallic plane for antenna 822 in the package layer, and only the metallic plane for antenna 821 is needed in the package layer, which further reduces the size of package antenna and package unit of radar modules.

Besides, to make the distribution more even in the fabrication, dummy 104 in the form of hole or metallic patch can be set in the blank area (non-element area) of routing layer 101. In another optional embodiment, dummy in the form of hole or metallic patch can be set in the metallic plane of antenna 822.

Figure 16:
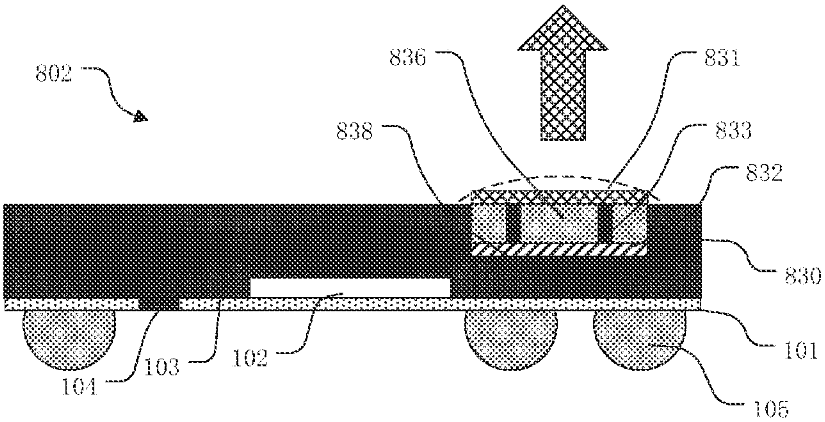
FIG. 16 is a cross-sectional view of the radar assembly package that has AOP (Antenna on Package) package antenna in one optional embodiment.

FIG. 16 is a cross-sectional view of the radar assembly package that has AOP package antenna in one optional embodiment. Radar assembly package 802 can include routing layer 101, raw die 102 set on the front surface of routing layer 101, package layer 103 covering raw die 102 and AOP package antenna 830. Routing layer 101 can be fan-out metallic layer and AOP package antenna 830 can be electrically connected to raw die 102 through routing layer 101.

In this embodiment, AOP package antenna 830 can include antenna 832, antenna 831 above the radiation plane of antenna 832, dielectric layer 836 between antenna 831 and antenna 832, and connection line 833 (e.g. via conductors) for antenna 832 and antenna 831.

In this embodiment, each part of AOP package antenna 830 can be fabricated during the packaging processes of raw die 102 to form wafer-level antenna on package 830. Antenna 832, substrate layer 836 and connection line 833 of AOP package antenna 830 are formed within package layer 103 and antenna 831 is formed on the surface of package layer 103 and electrically connected to connection line 833. AOP package antenna 830 fully makes use of the surface of package layer to further reduce the size of radar assembly package and the connection loss between chip and antenna.

In this embodiment, the specific structures of antenna 831 and antenna 832 are the same as those of first antenna and second antenna of package antenna as shown in FIG. 1 to FIG. 13. The specific structures of routing layer 101, raw die 102 and package layer 103 are the same as those of routing layer, raw die and package layer in FIG. 14. For clarity and simplicity, similarities are not to be elaborated herein.

In another optional embodiment, antenna 832 can be formed in the metallic plane of routing layer 101. For example, antenna 832 can be formed by slot pattern as result of etching metallic plane of routing layer 101. This means there is no need to have a metallic plane for antenna 832 in the package layer, and only the metallic plane for antenna 831 is needed in the package layer, which further reduces the size of package antenna and package unit of radar modules.

Figure 17:
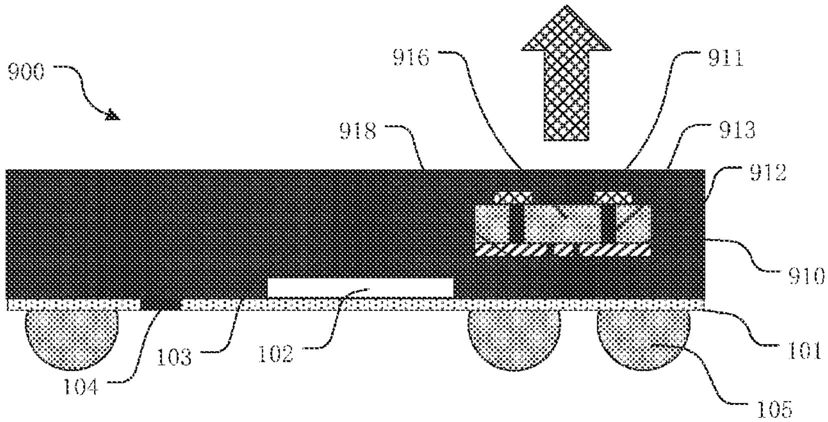
FIG. 17 is a cross-sectional view of the radar assembly package that has an AIP package antenna in one optional embodiment.

FIG. 17 is a cross sectional view of the radar assembly package that has AIP package antenna in one optional embodiment. Radar assembly package 900 includes routing layer 101, raw die 102 on routing layer 101, package layer 103 covering raw die 102 and AIP package antenna 910 in package layer 103. Routing layer 101 can be fan-out metallic layer and AIP package antenna 910 can be electrically connected to raw die 102 through routing layer 101.

In an optional embodiment, as shown in FIG. 17, AIP package antenna 910 can be fabricated alone and then packaged together with raw die 102. Or, each part of AIP package antenna 910 can be fabricated during the packaging processes of raw die 102 to form wafer-level package antenna, which increases flexibility.

For example, as shown in FIG. 17, AIP package antenna 910 can include antenna 912, antenna 911 above the radiation plane of antenna 912, substrate layer 916 between antenna 911 and antenna 912, and connection line 913 (e.g. via conductors) for antenna 912 and antenna 911. In this embodiment, each part of AIP package antenna 910 can be fabricated during the packaging procedures of raw die 102 to form wafer-level package antenna. Also, the specific structures of antenna 911 and antenna 912 are the same as those of slot antenna and dipole of the package antenna as shown in FIG. 3 to FIG. 13. For clarity and simplicity, similarities are not to be elaborated herein.

In another optional embodiment, slot antenna 912 in FIG. 17 can be formed in the slot structure of routing layer 101. For example, antenna 912 can be formed by slot pattern as result of etching metallic plane of routing layer 101. This means there is no need to have a metallic plane for antenna 912 in the package layer, and only the metallic plane for dipole is needed in the package layer, which further reduces the size of package antenna and package unit of radar modules.

In an optional embodiment, dielectric layer 916 shown in FIG. 17 can be glass fiber board or epoxy resin board (FR4), ceramic substrate or HF/RF substrate and its insulation can insulate slot antenna 912 from dipole 911. Slot antenna 912 and dipole 911 both can be the result of the patterning of metallic plane while connection line 913 can be via conductors that fill the holes of substrate layer 916 with copper material. To make materials more evenly distributed in the fabrication, dummy 104 in the form of hole or metallic patch can be set in the blank area (non-element area) of routing layer 101.

In another optional embodiment, raw die 102 as shown in FIG. 17 can send signals to slot antenna 912 through routing layer 101 and feeding line 918, and can further send signals to dipole 911 through connection line 913. In other alternative embodiments, package antenna 910 can include transmission line coupled with ground layer and use transmission line instead of feeding line to transmit signals. It can also feed dipole 911 and slot antenna 912 with a separate transmission line through routing layer 101.

Figure 18:
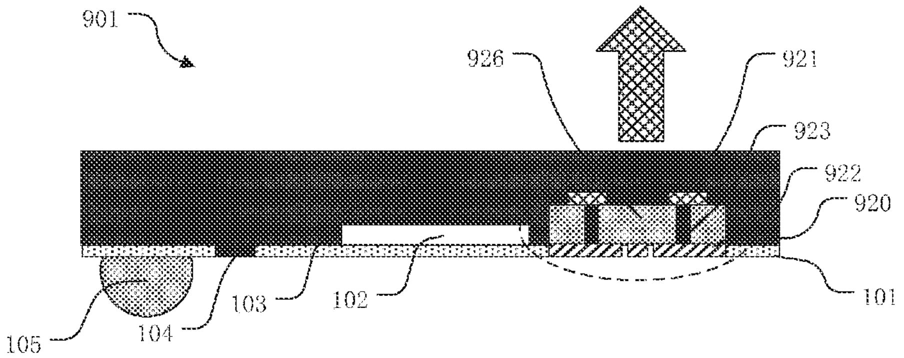
FIG. 18 is a cross-sectional view of the radar assembly package that has an AIP package antenna in another optional embodiment.

FIG. 18 is a cross-sectional view of the radar assembly package that has AIP package antenna ( ) in another optional embodiment. Radar assembly package 901 can include routing layer 101, raw die 102 on routing layer 101, package layer 103 covering raw die 102 and AIP package antenna 920 in package layer 103. Routing layer 101 can be fan-out metallic layer and AIP package antenna 920 can be electrically connected to raw die 102 through routing layer 101.

In this embodiment, AIP package antenna 920 can include slot antenna 922, antenna 921 above the radiation plane of antenna 922, dielectric layer 926 between antenna 921 and antenna 922, and connection line 923 (e.g. via conductors) for antenna 922 and antenna 921.

In AIP package antenna 920 of the radar assembly package 901, connection line 923 goes through substrate layer 926, and dipole 921 is electrically connected to slot antenna through via conductors. Also, slot antenna 922 can be formed in the metallic plane of routing layer 101 and electrically connected to raw die 102 through routing layer 101. For example, antenna 922 can be formed by slot pattern as result of etching on metallic plane of routing layer 101. Compared with the radar assembly package as shown in FIG. 17, the radar assembly package as shown in FIG. 18 omits feeding line 918. This means there is no need to have a metallic plane for antenna 922 in the package layer, and only the metallic plane for antenna 921 is needed in the package layer, which further reduces the size of package antenna and package unit of radar modules.

Besides, to make materials more evenly distributed in the fabrication, dummy 104 in the form of hole or metallic patch can be set in the blank area (non-element area) of routing layer 101. In another optional embodiment, dummy in the form of hole or metallic patch can be set in the metallic plane of antenna 922.

Figure 19:
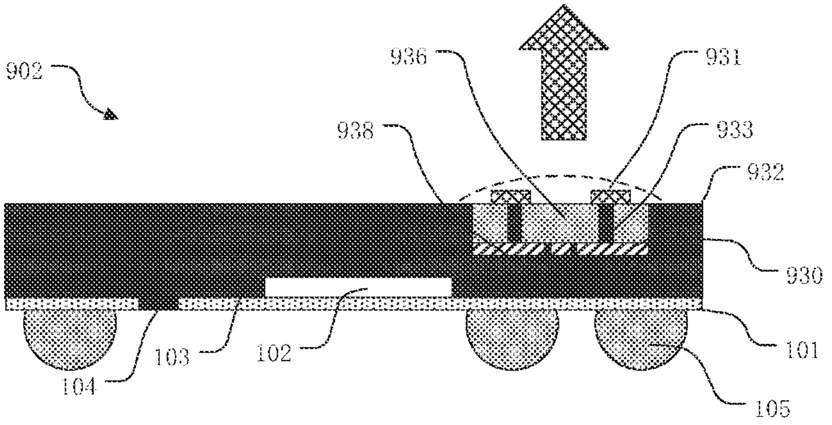
FIG. 19 is a cross-sectional view of the radar assembly package that has an AOP (Antenna on Package) package antenna in another optional embodiment.

FIG. 19 is a cross sectional view of the radar assembly package that has AOP package antenna in another optional embodiment. Radar assembly package 902 can include routing layer 101, raw die 102 on routing layer 101, package layer 103 covering raw die 102 and AOP package antenna 930. Routing layer 101 can be fan-out metallic plane and AOP package antenna 930 can be electrically connected to raw die 102 through routing layer 101.

In this embodiment, AOP package antenna 930 can include slot antenna 932, dipole 931 above the radiation plane of slot antenna 932, dielectric layer 936 between slot antenna 932 and dipole 931, and connection line 933 (e.g. via conductors) for slot antenna 932 and dipole 931.

In this embodiment, each part of AOP package antenna 930 can be fabricated during the packaging procedures of raw die 102 to form wafer-level package antenna. Slot antenna 932, substrate layer 936 and connection line 933 of AOP package antenna 930 are formed within package layer 103 and dipole 931 is formed on the surface of package layer 103 and electrically connected to connection line 933. AOP package antenna 930 fully makes use of the surface of package layer to further reduce the size of radar assembly package and the connection loss between chip and antenna.

In this embodiment, the specific structures of dipole 931 and slot antenna 932 are the same as those of dipole and slot antenna of the package antenna shown in FIG. 1 to FIG. 13. The specific structures of routing layer 101, raw die 102 and package layer 103 are the same as those of routing layer, raw die and package layer in FIG. 14. For clarity and simplicity, similarities are not to be elaborated herein.

In another optional embodiment, slot antenna 932 in FIG. 19 can be formed in the slot structure of routing layer 101. For example, slot antenna 932 can be formed by slot pattern as result of etching on metallic plane of routing layer 101. This means there is no need to have a metallic plane for antenna 932 in the package layer, and only the metallic plane for dipole is needed in the package layer, which further reduces the size of package antenna and package unit of radar module.

Traditional radar assembly package needs a large ground layer, and holes for via conductors are need to be formed in the ground layer. Compared with traditional radar assembly package, the radar assembly package in this embodiment has package antenna whose slot antenna or second antenna replaces the ground layer, and slot antenna or second antenna can cancel the electromagnetic waves in the designated area so as to achieve directional radiation, which also simplifies the structure of radar assembly package, effectively reduces manufacturing costs and expands future application fields.

Figure 20:
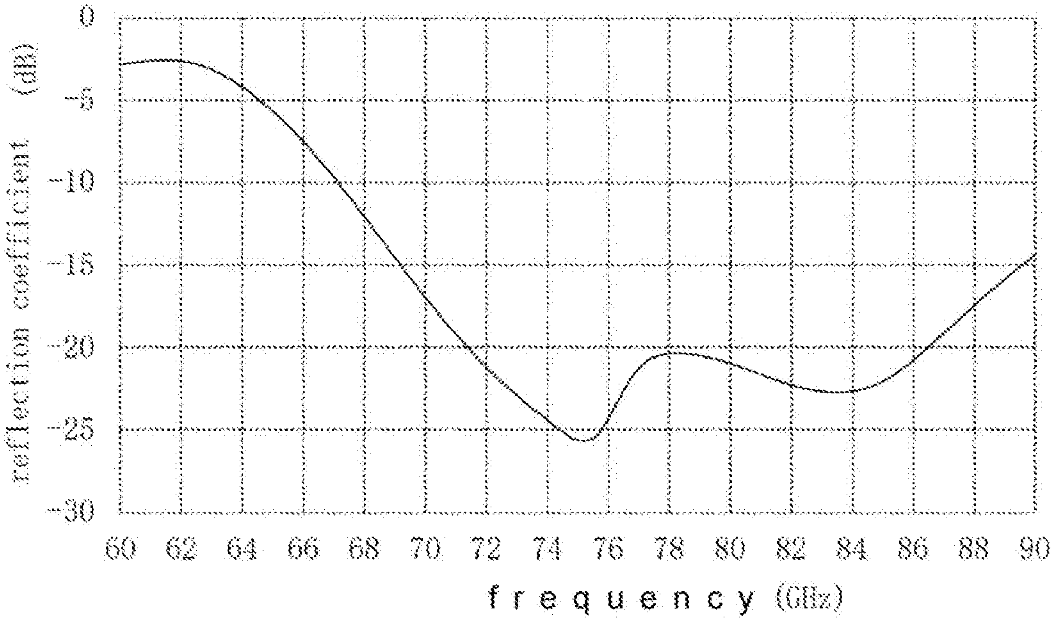
FIG. 20 is a frequency response plot of the package antenna in one optional embodiment.

FIG. 20 is a frequency response graph of the package antenna in one optional embodiment. As shown, x-axis represents frequency while y-axis represents reflection coefficient. As shown in FIG. 3 to FIG. 5, based on the structure of the package antenna, reflection coefficient of package antenna 210 at different working frequencies can be learnt, which is the power ratio of reflection waves and incident waves at antenna feeding port, i.e. return loss ratio. The smaller the coefficient, the greater the radiation from the antenna.

As shown in FIG. 20, coefficients of package antenna 210 at 77.6- to 86.5-GHz are smaller than −20 dB. With 77-GHz as the central frequency, the working bandwidth of package antenna 210 can range from 71.6-GHz to 86.5-GHz, which is far greater than the package antenna of the present radar assembly package as shown in FIG. 1. As mentioned in the foregoing, fabs for routing layer processing at best have 0.1 mm-level technology and accuracy. Working frequency of the antenna can have a deviation of 10%. Package antenna in this embodiment has relatively wide bandwidth so that even if the manufacturing fails to meet the exact requirement, the package antenna with relatively small reflection coefficient can still meet the requirement for RF module to work.

Figure 21:
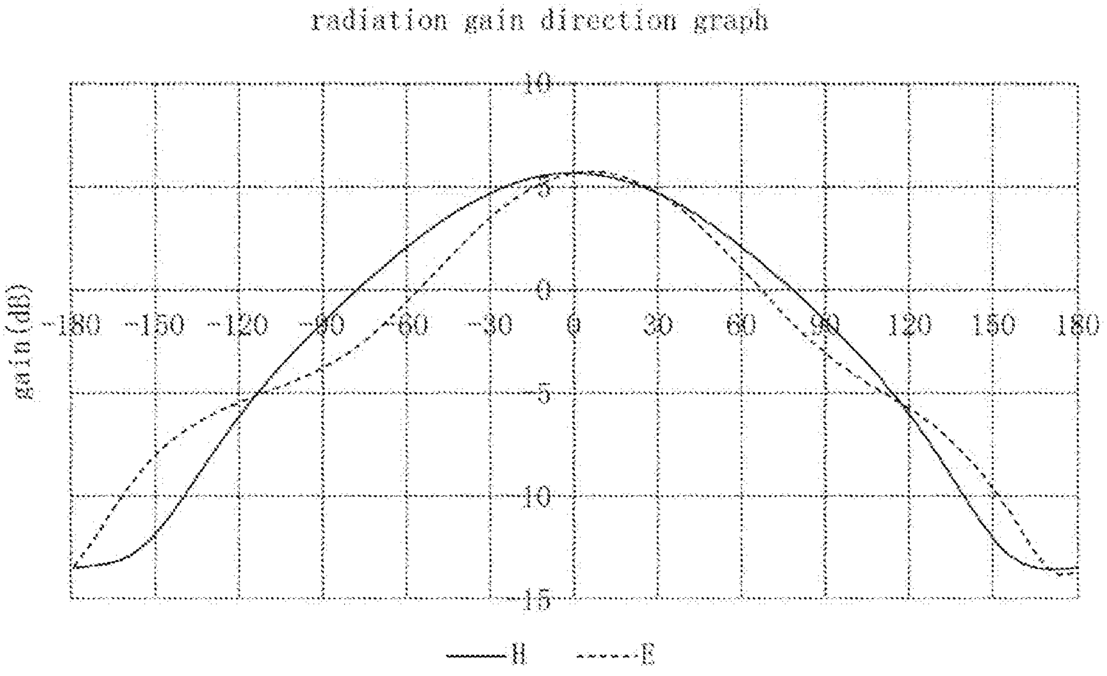
FIG. 21 is a radiation gain direction graph of the package antenna in one optional embodiment.

FIG. 21 is a radiation gain direction graph of the package antenna in one optional embodiment. Based on the structure of package antenna in FIG. 3 to FIG. 5, x-axis of the graph represents radiation gain of magnetic intensity (H) and electric intensity (E) while y-axis represents direction angle to the normal line direction of the dipole's metallic plane of package antenna 210.

As shown in FIG. 21, the main radiation of the package antenna comes from the front (0° to ±90°) while back radiation is relatively weak. This feature ensures the package antenna of this disclosure can be applied in multiple complex system environments as impact from routing layer design on antenna direction design is relatively weak.

It should be noted that in this disclosure, relationship terms such as first and second are only used to differentiate one entity or operation from another entity or operation and not to indicate the actual relationship or sequence. Also, term "include" "including" or any other variations are meant to non-exclusively include, where processes, methods, objects or equipment comprising a series of elements include not only these elements, but also off-the-list or inherent elements. If without more limitations, elements following "include a/an" do not exclude the same elements not listed thereof.

The embodiments described above do not elaborate all details or limit the present disclosure to the specific embodiments. Obviously, based on the above description, many modifications and changes can be made. The embodiments described above are selected to better explain the theoretical basis and practical applications so that those skilled in the art can make good use of this disclosure and make modifications. This disclosure is only limited by the claims and their full scope and equivalents.

What is claimed is:

1. A package antenna, comprising:

a slot antenna, wherein the slot antenna includes a metallic plane and a slot defined in the metallic plane, and wherein the slot antenna is configured to radiate from the slot;

a dipole positioned above a radiation plane of the slot antenna;

a dielectric layer between the slot antenna and the dipole, wherein the slot antenna functions as a reflector for the dipole to achieve directivity of the package antenna; and a connection line throughout the dielectric layer along a thickness direction, wherein all conductors are electrically connected to a wave guide or a feeding line of the slot antenna through the connection line, and wherein the slot antenna is a slotted waveguide antenna and all conductors are electrically connected to a waveguide of the slotted waveguide antenna through the connection line, or the slot antenna is a non-waveguide slotted antenna with a feeding line and all conductors are electrically connected to the feeding line through the connection line.

2. The package antenna of claim 1, projections of the dipole partially cover a radiation plane of the slot antenna in a direction opposite to a direction of directional radiation of the package antenna.

3. The package antenna of claim 1, wherein a radiation plane of the slot antenna is parallel to that of the dipole.

4. The package antenna of claim 1, wherein the dielectric layer is an insulation layer that insulates the slot antenna from the dipole, and wherein the dielectric layer is operable to adjust a distance between the slot antenna and the dipole.

5. The package antenna of claim 1, wherein the dipole includes at least one pair of conductors, wherein, in an opposite direction to a direction of directional radiation of the package antenna, projections of any pair of the conductors of the dipole are at both sides of the slot.

6. The package antenna of claim 1, wherein the connection line physically connects the slot antenna and the dipole.

7. A radar assembly package, comprising:

a routing layer;

a raw die on the routing layer;

a package antenna electrically connected to the raw die through the routing layer, wherein the package antenna includes:

a slot antenna, a dipole positioned above a radiation plane of the slot antenna, and a dielectric layer between the slot antenna and the dipole, wherein the slot antenna functions as a reflector for the dipole to achieve directivity of the package antenna; and a package layer, wherein the package layer seals the raw die on the routing layer, wherein the raw die and the dipole of the package antenna are at a same side of the routing layer, and wherein the dipole is set on a surface of or inside the package layer.

8. The radar assembly package of claim 7, wherein the slot antenna of the package antenna is set in a slot structure of the routing layer.

9. The radar assembly package of claim 7, wherein the slot antenna of the package antenna is formed in the package layer.

10. The radar assembly package of claim 7, wherein the routing layer includes element and non-element areas, and wherein the raw die and the dipole are set in the element area while dummy is set in the non-element area of the routing layer.

11. The radar assembly package of claim 7, further comprising:

a feeding structure physically connecting the slot antenna and the dipole.

* * * * *